(12) United States Patent
Allen et al.

(10) Patent No.: US 7,814,375 B2
(45) Date of Patent: Oct. 12, 2010

(54) FAULT DISCOVERY AND SELECTION APPARATUS AND METHOD

(75) Inventors: Corville O. Allen, Morrisville, NC (US); John H. Green, Toronto (CA); Simon A. J. Holdsworth, Andover (GB); Piotr Przybylski, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/847,278

(22) Filed: Aug. 29, 2007

(65) Prior Publication Data
US 2009/0063832 A1 Mar. 5, 2009

(51) Int. Cl.
*G06F 11/00* (2006.01)
(52) U.S. Cl. .............................. 714/48; 714/25; 714/38; 714/57; 712/244
(58) Field of Classification Search .................. 714/25, 714/38, 47, 48, 57; 712/244
See application file for complete search history.

(56) References Cited

U.S. PATENT DOCUMENTS

| | | | |
|---|---|---|---|
| 6,199,141 B1 | 3/2001 | Weinreb et al. | 711/118 |
| 6,892,330 B2 | 5/2005 | Lee | 714/48 |
| 6,961,932 B2 | 11/2005 | Mishra et al. | 717/186 |
| 7,007,198 B2 | 2/2006 | Boling | 714/15 |
| 7,069,562 B2 | 6/2006 | Kushnirskiy et al. | 719/328 |
| 7,120,898 B2 | 10/2006 | Grover et al. | 717/114 |
| 7,379,846 B1 * | 5/2008 | Williams et al. | 714/25 |
| 7,487,433 B2 * | 2/2009 | Sivakumar et al. | 714/57 |
| 2003/0204645 A1 | 10/2003 | Sharma et al. | |
| 2005/0193286 A1 * | 9/2005 | Thatte et al. | 714/48 |
| 2007/0022321 A1 | 1/2007 | Chua et al. | |
| 2008/0109683 A1 * | 5/2008 | Erwin et al. | 714/25 |
| 2009/0049068 A1 | 2/2009 | Adkins et al. | |
| 2009/0138511 A1 | 5/2009 | Strub et al. | |

FOREIGN PATENT DOCUMENTS

WO WO0038073 6/2000

OTHER PUBLICATIONS

Samuel et al., "Framework and Method to Inject Failures into the System for Diagnosing", Oct. 17, 2006, ip.com.
Christensen et al., "Web Services Description Language (WSDL) 1.1", internet-Google, http://www.w3org.TR/2001/NOTE-wsdl-20010315.
Gish et al., "Enterprise Metadata Discovery", A Joint White Paper With IBM and BEA, Dec. 2004.
"Enterprise Metadata Discovery", IBM and BEA collaborate on advancing the J2EE Connector Architecture, Dec. 2004, updated Jun. 2005, http://www-128.ibm.com/developerworks/library/specification/j-emd/.

* cited by examiner

*Primary Examiner*—Robert Beausoliel
*Assistant Examiner*—Joseph D Manoskey
(74) *Attorney, Agent, or Firm*—Kunzler Needham Massey & Thorpe

(57) ABSTRACT

A method and apparatus are disclosed for discovering and selecting faults where more than one programming model is involved. The present invention enables selection of faults and the mappings necessary to handle exceptions across multiple code environments.

9 Claims, 2 Drawing Sheets

FAULT DISCOVERY AND SELECTION APPARATUS AND METHOD

BACKGROUND OF THE INVENTION

1. Field of the Invention

The invention relates to the process of handling an exception. Specifically, the invention relates to devices, methods, and systems to map exceptions from a source system to a target system.

2. Description of the Related Art

Exceptions are thrown when the normal execution of program code is interrupted. Specifically, business exceptions occur when data causes inconsistencies in a data store. Such exceptions can be managed through business exception handlers.

In the case where an exception needs to be mapped from one programming model to another model, functions typically need to be written for each possible model and exception. The process of handling multiple exceptions and models may require extensive programming and familiarity with the programming models involved. Furthermore, current exception handling methodologies fail to provide an adaptable or configurable way to select an exception mapping at build time.

SUMMARY OF THE INVENTION

The present invention has been developed in response to the present state of the art, and in particular, in response to the problems and needs in the art that have not yet been fully solved by currently available exception handling methods. Accordingly, the present invention has been developed to provide an apparatus and method to facilitate runtime exception mapping that overcomes many or all of the above-discussed shortcomings in the art.

A method to generate business fault objects may be embodied as a computer program comprising the operations necessary to discover faults and generate exception mappings at runtime. The combined operations enable a programmer to establish a framework at build time that flexibly handles run-time exceptions. Instead of coding each exception individually, a programmer may use the present invention to set the mappings and data formatting necessary to properly handle exceptions between source and target systems In one embodiment, the operations include receiving one or more exceptions from a source system and determining corresponding fault names on a target system. In certain embodiments, the target system is a programming model independent of the source system.

The operations may also include generating a fault data description based on the determined fault name. In one embodiment, generating fault data descriptions includes selecting an XML schema definition. The definition determines what data is included in the fault data description, as well as the format.

Each discovered fault may correspond to a fault binding. A binding is typically used to link libraries, or look up tables, to application programs. Using fault binding tables enables runtime selection of a binding without knowing the exact location of the binding. In one embodiment of the present invention, the fault bindings are found in a look-up table on the target system. The fault bindings to be used may be specified at build time.

The fault bindings may be used to generate fault objects compatible with the target system programming model. A discovered "customer already exists" fault, for example, would call for the generation of a fault object containing both the exception and the data pertaining to that particular customer.

The fault objects on the source system are converted to business fault objects compatible with the target system. The business fault objects might be structured differently or contain different data than the original fault object. For example, the "customer already exists" business fault object might exclude information not relevant to the target system. On the other hand, the "customer already exists" business fault object might include additional relevant information such as a first or last name pertaining to the customer ID in question.

The operations may further include returning the business fault objects to a user. In one embodiment, returning the business fault objects to a user includes displaying the business fault object and/or storing the business fault object. The display may contain relevant information about the data type required, user input errors, and/or the relevant data. By returning the business fault objects, exception handlers can notify the user of the data error in greater detail. In the "customer already exists" example, providing the name and ID of the existing customer enables the user to better identify and correct the data inconsistencies.

In another aspect of the present invention, an apparatus to convert exceptions to business fault objects includes an exception generation module on a source system, an exception handling module that receives exceptions, and a discovery module that provides the framework to discover one or more faults based on the received exceptions.

In one embodiment, the discovery module is activated at build time to provide a framework for fault discovery. With the framework in place from build time execution, the discovery module may inspect exceptions in the system at run time. By examining exceptions, the discovery module may determine which exceptions should map to corresponding faults. The discovery module discovers fault mappings prior to runtime processing by implementing a fault selector module, a data binding module, and a fault data description module. The discovery module may discover fault mappings through means of a look up table.

In one embodiment, a fault selector module determines the fault names appropriate for a target system by examining the fault. The fault selector may examine a field within the source system exception or examine the exception name. Based on the name of the source system exception the fault selector will return a name, thereby enabling the target system to perform mappings at runtime.

Additionally, the fault selector module may iterate through all of the possible exceptions at run time in order to select the appropriate fault. The fault selector configurability name-fault pair enables flexible selection of a fault at runtime. The discovered fault names may be utilized by a data binding module to select appropriate fault bindings corresponding to the fault names. The data binding module may be further configured to convert fault data to a runtime format.

Additionally, a fault data description module may gather information relevant to the data effected by requested operations. An XML schema definition module may be used to set the format of the fault data. In some embodiments, the data defined by the xml schema definition and the fault information defined by the fault bindings are combined by the business fault object generation module into a business fault object.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
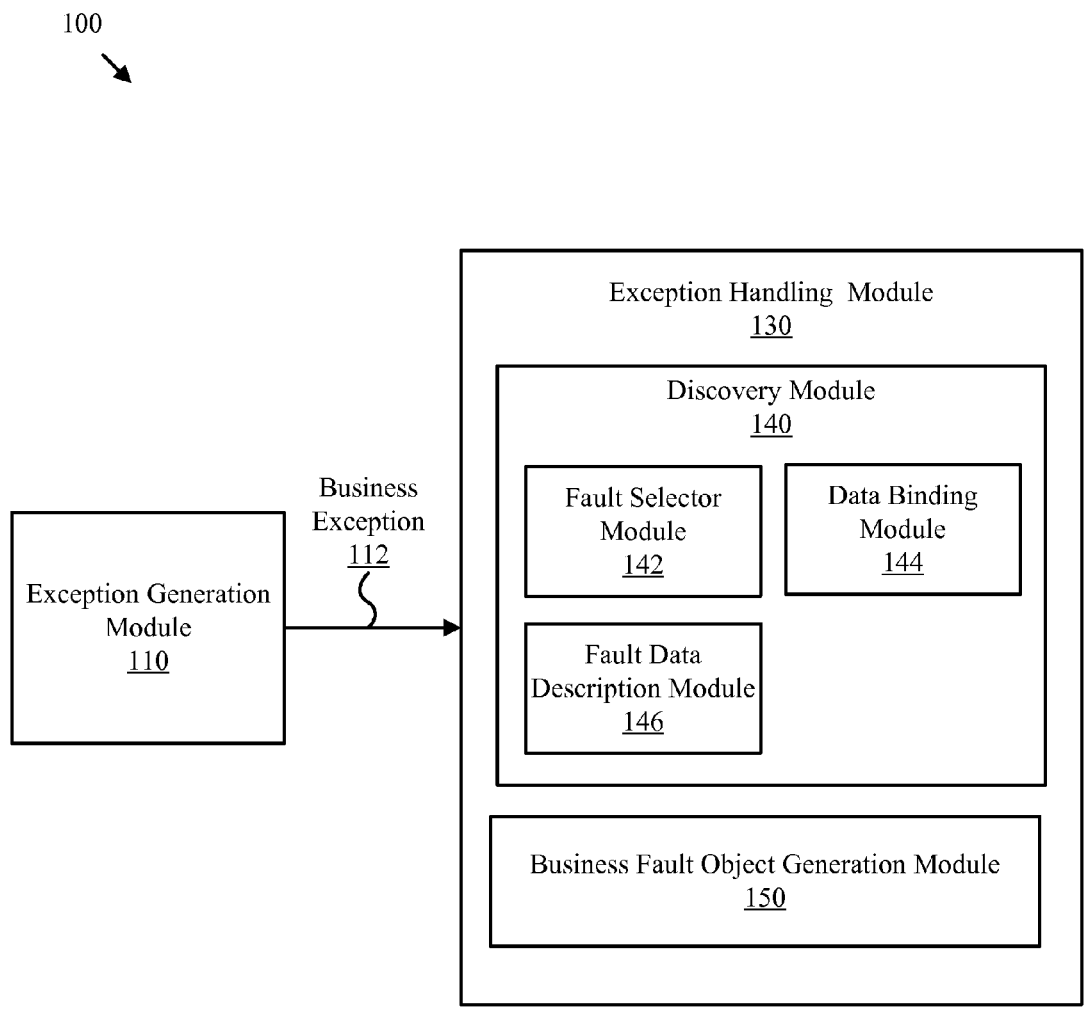
FIG. 1 is a block diagram depicting one embodiment of a fault discovery and selection apparatus in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a transmission line bearing a signal, a compact disk, a digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram depicting one embodiment of a fault discovery and selection apparatus 100 in accordance with the present invention. As depicted, the fault discovery and selection apparatus 100 includes an exception generation module 110, an exception handling module 130, a discovery module 140, a fault selector module 142, a data binding module 144, a fault data description module 146, and a business fault object generation module 150. The fault discovery and selection apparatus 100 converts exceptions to business fault objects by selecting an appropriate conversion format at runtime. By combining data, structural definitions, and data bindings, the fault discovery apparatus appropriately handles exceptions from different programming models.

The exception generation module 110 throws a business exception 112 when data is not in an expected format. In some programming environments, these faulty data requests are referred to as data errors, application errors, or enterprise information system errors. An attempt to retrieve a non-existent record is one example of a faulty data request. In this case, the exception generation module 110 may recognize the missing data error and throw a corresponding business exception. The exception generation module 110 may throw multiple business exceptions 112 in cases where there are multiple data errors.

The exception handling module 130 receives the business exceptions 112 and determines a processing order. The discovery module 140 proceeds through the established order and identifies which exceptions should be mapped to corresponding faults. In one embodiment, the discovery module assigns a fault name, data binding, and fault data description to each exception through means of the fault selector module 142, data binding module 144, and fault data description module 146.

In one embodiment, the fault selector module 142 selects a fault name based on the type of exception received by the exception handling module 130. The fault selector module 142 may additionally select an identifiable routine based on the selected fault name.

In one embodiment, the fault data description module 146 queries an xml schema definition to determine the most appropriate set of definitions. The xml schema definition may establish an output format through means of an xml definition and determine which data and data format should be implemented.

In one example, a business exception is thrown when a customer already exists. In the depicted embodiment, the fault data description module 146 searches for a "duplicate customer" XML schema definition that is compatible with the source programming model. For example, in this case, the XML schema may call for the customer ID, customer name, and the error message. By describing the relevant information needed, the xml schema definition provides a framework for the data involved in exception handling.

In addition to a data framework, a program or binding for handling conversions may also be determined. In the depicted embodiment, the fault selector module 142 determines the program or binding to be used to convert from the source programming model to the target programming model. In one embodiment, the fault selector module 142 examines a lookup table to determine an appropriate data binding name. Additionally, the fault selector may return a null value. The data binding module 144 transforms a source exception to a runtime representation of a business fault. In one embodiment, the data binding is a class that implements an application interface to be executed at runtime.

The business fault object generation module 150 may combine the runtime representation of the business fault and the relevant data into a business fault object. In one embodiment, the generated business fault object is used for display or storage purposes.

Figure 2:
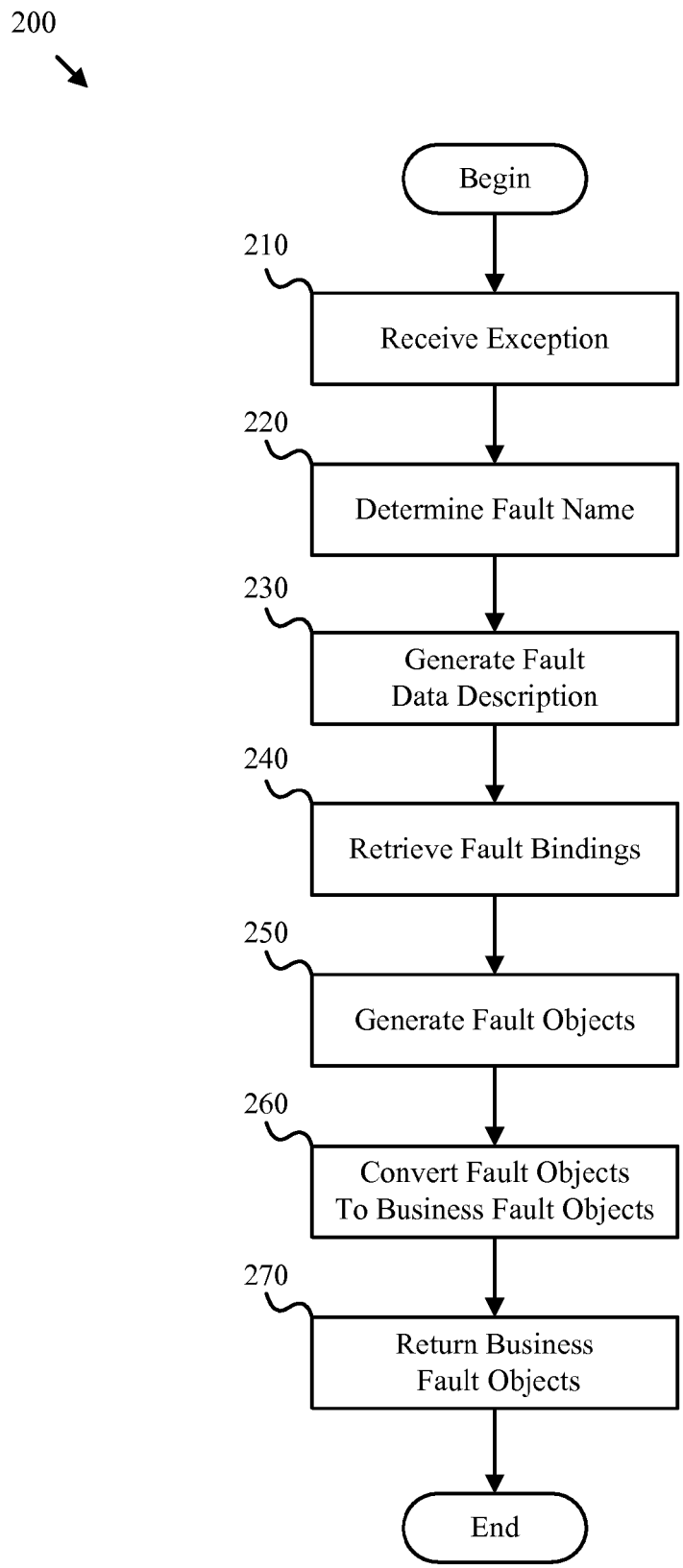
FIG. 2 is a schematic flow chart diagram illustrating one embodiment of a fault discovery and selection method in accordance with the present invention.

FIG. 2 is a schematic flow chart diagram illustrating one embodiment of a fault discovery and selection method 200. As depicted, the fault discovery and selection method 200 includes receiving 210 an exception, determining a 220 fault name, generating 230 a fault data description, retrieving 240 fault bindings, generating 250 fault objects, converting 260 fault objects to business fault objects, and returning 270 business object faults. The fault discovery and selection method 200 enables a programmer to write code that handles an exception without knowing the specific exception content or format.

Receiving 210 an exception entails accepting both the data and error messages generated by an exception on the source system. Since multiple exceptions may be thrown by a process, receiving 210 the exceptions may include temporarily storing data and error feedback. Once each exception has been received and stored, an identifier is assigned to each exception in the form of a fault name. In the depicted embodiment, determining 220 fault names includes examining the exceptions for relevant content. For example, a user not found exception may map to a "null user" fault name in the target programming model. The exception names on the target system may be arbitrary but nevertheless configured to match exceptions from a source system.

After the fault name is determined 220, a fault data description is generated. Once the fault data description is generated 230, the appropriate fault binding is retrieved 240. A configuration dataset may be queried to select the appropriate name-fault binding pair. Once the fault bindings have been retrieved, the bindings or programs may be executed to convert source exceptions to target exceptions. During the conversion, the binding execution may generate 250 fault objects recognizable by the target system.

Subsequently, the generated fault objects may be combined with pertinent data and error messages to form business fault objects. In the depicted embodiment, converting 260 fault objects includes structuring the fault objects to include output that would enhance the readability of the exception output on the target system. By including relevant customer information, the output can better identify the source of the original exception. When the business fault objects are returned 270 the error messages and data are displayed or stored. In one embodiment, multiple business fault objects may be referenced when the business fault objects are returned 270.

Automatically determining fault naming and bindings provides a flexible way to handle inter-system exception handling. In a currently implemented example, COBOL exceptions are mapped to simple expression languages through means of predetermined conversions. Without the present invention, an exception handler would have to be specifically coded for each exception and language. By storing the relevant information in a lookup table, predefining xml frameworks, and implementing business fault objects, the present invention enables a fast implementation of exception handling where multiple programming environments are involved.

What is claimed is:

1. A computer readable storage medium having a computer usable program encoded thereon executable to convert exceptions to business fault objects, the operations of the computer usable program comprising:

receiving an exception from a source system, the source system comprising a source system programming model;

determining a fault name on a target system, the fault name corresponding to the exception, the target system comprising a target system programming model independent of the source system programming model;

generating fault data descriptions based on the determined fault name;

finding a fault binding on the target system corresponding to the determined fault name;

utilizing the fault binding to generate fault objects compatible with the target system programming model;

converting the fault objects to business fault objects compatible with the target system programming model; and returning the business fault objects to a user.

2. The computer readable storage medium of claim 1, wherein generating fault data descriptions includes selection of an XML schema definition.

3. The computer readable storage medium of claim 1, wherein the fault binding is be found in a look-up table on the target system.

4. The computer readable storage medium of claim 1, wherein returning the business fault objects to a user includes displaying the business fault object.

5. The computer readable storage medium of claim 1, wherein returning the business fault objects to the user includes storing the business fault object.

6. The computer readable storage medium of claim 1, wherein each business fault object contains data corresponding to the exception.

7. An apparatus to convert exceptions to business fault objects, the apparatus comprising:

a processor;

a memory, the memory comprising an exception generation module configured to throw an exception on a source system, the source system comprising a source system programming model;

a discovery module configured to include a fault selector module, a data binding module, and a fault data description module;

the fault selector module configured to determine one or more fault names on a target system, the one or more fault names corresponding to the exception on the source system, the target system comprising a target system programming model independent of the source system programming model;

the data binding module configured to select and implement a fault binding for the determined fault names;

the fault data description module configured to set an output format of fault data; and a business fault object generation module configured to combine data and fault information into a business fault object.

8. The apparatus of claim 7 wherein the data binding module further converts fault data to a runtime format.

9. The apparatus of claim 7 wherein the fault data description module selects an XML schema definition.

* * * * *